United States Patent
Mei et al.

(10) Patent No.: US 9,373,036 B1
(45) Date of Patent: Jun. 21, 2016

(54) COLLABORATIVE DISTANCE METRIC LEARNING FOR METHOD AND APPARATUS VISUAL TRACKING

(71) Applicants: Toyota Motor Engineering & Manufacturing North America, Inc., Erlanger, KY (US); Dalian University of Technology, Dalian (CN)

(72) Inventors: Xue Mei, Ann Arbor, MI (US); Luning Liu, Dalian (CN); Danil V. Prokhorov, Canton, MI (US); Huchuan Lu, Dalian (CN)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/598,690

(22) Filed: Jan. 16, 2015

(51) Int. Cl.
| | |
|---|---|
| *G06K 9/00* | (2006.01) |
| *G06K 9/62* | (2006.01) |
| *G06K 9/52* | (2006.01) |
| *G06T 11/60* | (2006.01) |
| *G06T 11/20* | (2006.01) |
| *G06K 9/46* | (2006.01) |
| *H04N 5/225* | (2006.01) |

(52) U.S. Cl.
CPC ........ *G06K 9/00624* (2013.01); *G06K 9/00785* (2013.01); *G06K 9/4642* (2013.01); *G06K 9/52* (2013.01); *G06K 9/6201* (2013.01); *G06K 9/6256* (2013.01); *G06T 11/206* (2013.01); *G06T 11/60* (2013.01)

(58) Field of Classification Search
CPC .................................. G06K 9/00; G06T 11/00
USPC .......... 382/103, 107, 236; 348/169, 170, 171, 348/172, 352
See application file for complete search history.

(56) References Cited

U.S. PATENT DOCUMENTS

| | | | | | |
|---|---|---|---|---|---|
| 7,720,993 | B2 * | 5/2010 | Liu | ......................... | H04L 29/06 370/238 |
| 8,868,489 | B2 * | 10/2014 | Hood | ..................... | G06Q 10/10 705/300 |

FOREIGN PATENT DOCUMENTS

CN 103500345 A 1/2014

OTHER PUBLICATIONS

Jiang et al.; "Learning Adaptive Metric for Robust Visual Tracking"; Jul. 14, 2011; 13 pages; vol. 20, Issue 8; Image Processing, IEEE Transactions.
Lafon et al.; "Data Fusion and Multi-Cue Data Matching by Diffusion Maps"; Sep. 25, 2006; 21 pages; vol. 28, Issue 11; Pattern Analysis and Machine Intelligence, IEEE Transactions.
Anonymous; "Collaborative Distance Metric Learning for Visual Tracking"; 2014; 16 pages; ACCV.
(Continued)

*Primary Examiner* — Abolfazl Tabatabai
(74) *Attorney, Agent, or Firm* — Christopher G. Darrow; Darrow Mustafa PC (57) ABSTRACT

A collaborative distance metric leaning method and apparatus for visual tracking utilizes a distance metric to match the target with the best candidate. A collaborative distance metric learning algorithm is used for visual tracking by fusing two distance metrics learnt for different representations of the target. To further improve the performance of the trained distance metrics, a sample selection mechanism is also used that exploits the intrinsic structure of dense sampling.

18 Claims, 9 Drawing Sheets

(56) References Cited

OTHER PUBLICATIONS

Jia et al.; "Visual tracking via adaptive structural local sparse appearance model"; In: CVPR; 2012; pp. 1822-1829.

Zhong et al.; "Robust object tracking via sparsity-based collaborative model"; In: CVPR; 2012; pp. 1838-1845.

Jepson et al.; "Robust online appearance models for visual tracking"; PAMI 25; 2003; pp. 1296-1311.

Tang et al.; "Co-tracking using semi-supervised support vector machines"; In: ICCV; 2007; pp. 1-8.

Jiang et al.; "Adaptive and discriminative metric differential tracking"; In: CVPR; 2011; pp. 1161-1168.

Wang et al.; "Unsupervised metric fusion by cross diffusion"; In: CVPR; 2012; pp. 2997-3004.

Weinberger et al.; "Distance metric learning for large margin nearest neighbor classification"; In: NIPS; 2005.

Goldberger et al.; "Neighbourhood components analysis"; In: NIPS; 2004.

Hong et al.; "Dual-force metric learning for robust distracter-resistant tracker"; In: ECCV (1); 2012; pp. 513-527.

Li et al.; "Non-sparse linear representations for visual tracking with online reservoir metric learning"; In: CVPR; 2012; pp. 1760-1767.

Blum; "Combining labeled and unlabeled sata with co-training"; In: COLT; 1998; pp. 92-100.

Leistner et al.; "Semi-supervised boosting usual visual similarity learning"; In: CVPR; 2008.

Babenko et al.; "Robust object tracking with online multiple instance learning"; PAMI 33; 2011; pp. 1619-1632.

Henriques et al.; "Exploiting the circulant structure of tracking-by-detection with kernels"; In: ECCV (4); 2012; pp. 702-715.

Wang et al.; "A kernal classification framework for metric learning"; CoRR abs/1309.5823; 2013.

Davis et al.; "Information-theoretic metric learning"; In: ICML; 2007; pp. 209-216.

Guillaumin et al.; "Is that you? metric learning approaches for face identification"; In: ICCV; 2009; pp. 498-505.

Globerson et al.; "Metric learning by collapsing classes"; In: NIPS; 2005.

Chang et al.; "A library for support vector machines"; 2001; pp. 27.

Adam et al.; "Robust fragments-based tracking using the integral histogram"; In: CVPR (1); 2006; pp. 798-805.

Ross et al.; "Incremental learning for robust visual tracking"; IJCV 77; 2008; pp. 125-141.

Bao et al.; "Real time robust l1 tracker using accelerated proximal gradient approach" In: CVPR; 2012; pp. 1830-1837.

Zhang et al.; "Robust visual tracking via multi-task sparse learning" In: CVPR; 2012; pp. 2042-2049.

Grabner et al.; "Semi-supervised on-line boosting for robust tracking"; In: ECCV (1); 2008; pp. 234-247.

Kwon et al.; "Visual tracking decomposition"; In: CVPR; 2010; pp. 1269-1276.

* cited by examiner

COLLABORATIVE DISTANCE METRIC LEARNING FOR METHOD AND APPARATUS VISUAL TRACKING

BACKGROUND

Visual tracking is a fundamental problem in computer vision, with many applications involved in various fields, such as motion analysis, human computer interaction, robot perception and traffic monitoring, etc. While much progress has been made in recent years, there still exist many challenges in designing a robust visual tracking algorithm, which are mainly caused by varying illumination, camera motion, occlusions, pose variation and rotation.

One of the issues in visual tracking is to match the target's visual appearances over consecutive video frames. Similar to many other computer vision problems such as image retrieval and object recognition, the matching process is largely stipulated by the coaction of the appearance model of the target that describes the target with unpredictable variations due to complex and dynamic scenes and the distance metric that determines the matching relations, e.g., the candidates with the target in visual tracking, or the whole image set with the query image in image retrieval domain.

Distinct from those retrieval or recognition tasks, a tracking problem holds a uniqueness that the appearance model and distance metric are both required to be adaptive to the changes of target as well as background over video frames.

The appearance model of the target plays a big role in visual tracking. In other words, if a strong appearance model can be constructed which is invariant to illumination changes and local deformation, discriminative from the background, and capable of handling occlusions, even simple and fixed distance metric like the Euclidean distance results in favorable matching performance. However, respectable difficulties arise to obtain a good appearance model which is able to handle the difficulties mentioned above. Although many excellent models are designed to describe the target in recent years, few algorithms can deal with various challenges at once. They usually only focus on solving certain tracking issues. When strong appearance model cannot be easily accessed, the choice of distance metrics for visual tracking becomes particularly critical. Many recent researches explored single distance metric learning in tracking problem and obtained pleasant results.

Recently, more and more tracking algorithms in collaborative framework achieve satisfactory performances. These approaches are all based on a simple motivation that single description of the object has its limitation in object representation and may lose helpful discriminative information for matching.

SUMMARY

One aspect of the present method includes (1) a distance metric fusion framework for visual tracking and (2) an effective samples selection mechanism in a distance metric learning process.

The method includes tracking a target object in sequential frames of images containing the target object including determining a target image depicting a first tracking position associated with a target object in one frame of an image sequence; generating, by a processor, a plurality of sample windows about the first tracking position of the target object by using sliding windows; classifying, by the processor, image targets in the sliding windows by Gaussian Kernel Regularized Least Square; collecting all sub-windows; computing sub-window scores; creating, by the processor, a negative sample set; creating two weight graphs of the template and target candidates with node links; calculating, by the processor, a distance metric fusion by cross diffusion; and tracking an object to the sequential frames of images using a collaborative distance metric.

The step of collecting all sub-windows can be performed by a sliding window process.

The step of computing sub-windows scores can include selecting samples with a higher response score.

The step of generating a distance metric fusion by cross diffusion includes generating, by the processor, two finite weighted graphs with target candidates and the template as vertices and links between pairs of nodes as edges; and fusing two graphs by cross diffusion.

The method further includes constructing an affinity matrix using K nearest neighbors method where K is a constant.

The method can further include constructing, by the processor, a weighted identity matrix, a plurality of status matrices; and choosing the arithmetic average of two status matrices generated in the last iteration as a final decision matrix.

The step of tracking with a collaborative distance metric uses a RGB-doublet-SVM to project a RGB histogram to a doublet-SVM distance metric state.

The method further includes training a doublet-SVM distance metric and a max-pooling distance metric by positive and negative samples.

The method can include selecting a candidate in the decision matrix having the largest value as a final tracking result of the target object in the current image frame.

An apparatus for tracking an object over a plurality of sequential image frames includes an image sensor generating a plurality of sequential image frames of a target object in a field of view of the image sensor and outputting the sequential image frames by a processor receives the sequential image frames from the image sensors. The processor executes program instructions for determining a target image depicting a first tracking position associated with a target object in one frame of an image sequence; generating, by the processor, a plurality of sample windows about the first tracking position of the target object by using sliding windows; classifying, by the processor, image targets in sliding windows by Gaussian Kernel Regularized Least Square; collecting all sub-windows; computing sub-window scores; creating, by the processor, a negative sample set; creating two weight graphs of the template and target candidates with node links; calculating, by the processor, a district metric fusion by cross diffusion; and tracking an object to the sequential frames of images using a collaborating distance metric.

The processor can collect all sub-windows by a sliding window process.

The processor can compute sub-windows scores including selecting samples with a higher score.

The processor generates a distance metric fusion by cross diffusion including generating, by the processor, two finite weighted graphs with the template and target candidates as vertices and links between pairs of nodes as edges, and fusing two graphs by cross diffusion.

The processor constructs an affinity matrix using a K nearest neighbors method where K is a constant.

The processor constructs a weighted identity matrix, a plurality of status matrices, and chooses the arithmetic average of two status matrices generated in the last iteration as a final decision matrix.

The processor tracks a collaborative distance metric using a RGB-doublet-SVM to project a RGB histogram to a doublet-SVM distance metric state.

The processor trains a doublet-SVM distance metric and a max-pooling distance metric by positive and negative samples.

The processor selects a candidate in the decision matrix having the largest value as a final tracking result of the target object in the current image frame.

BRIEF DESCRIPTION OF THE DRAWING

The various features, advantages and other uses of the present method and apparatus will become more apparent by referring to the following detailed description and drawing in which.

DETAILED DESCRIPTION

Figure 1:
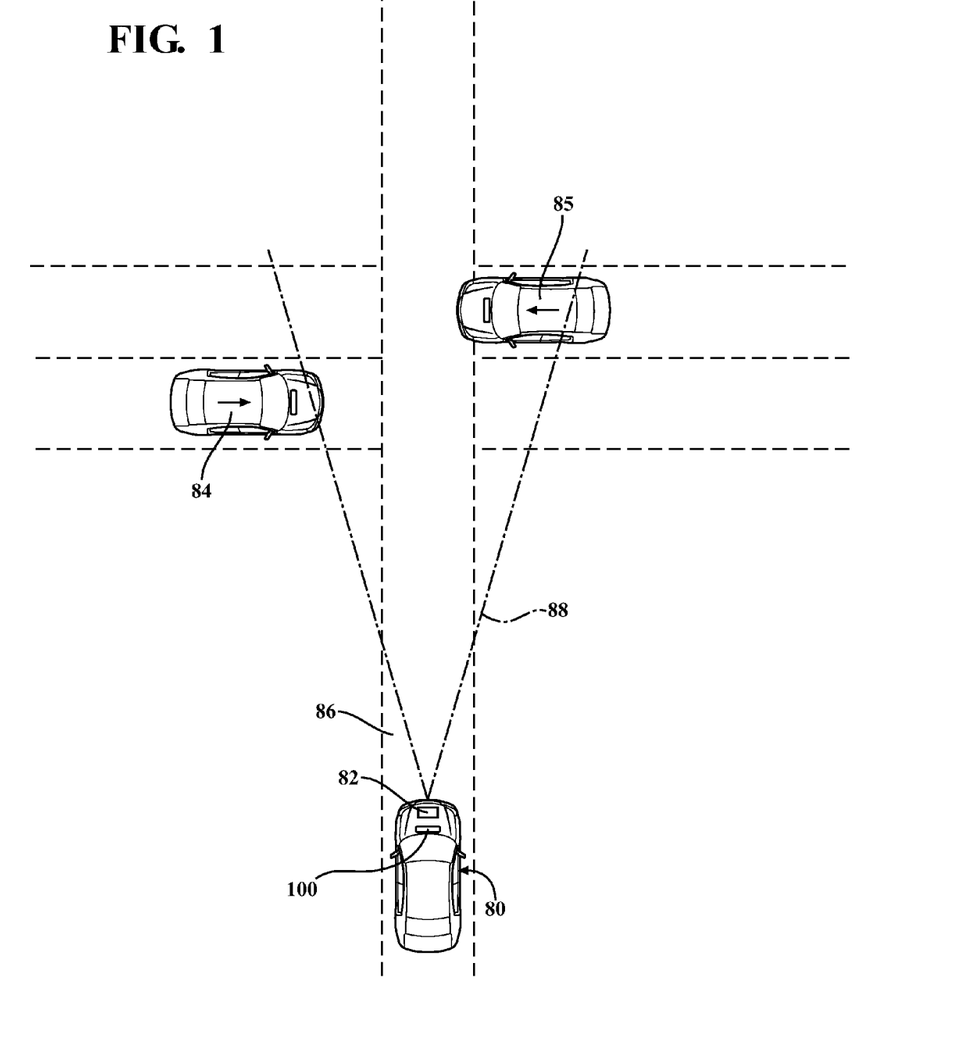
FIG. 1 is a pictorial representation of the present method and apparatus tracking one or more detected vehicles in the path of a viewing vehicle.
Figure 2:
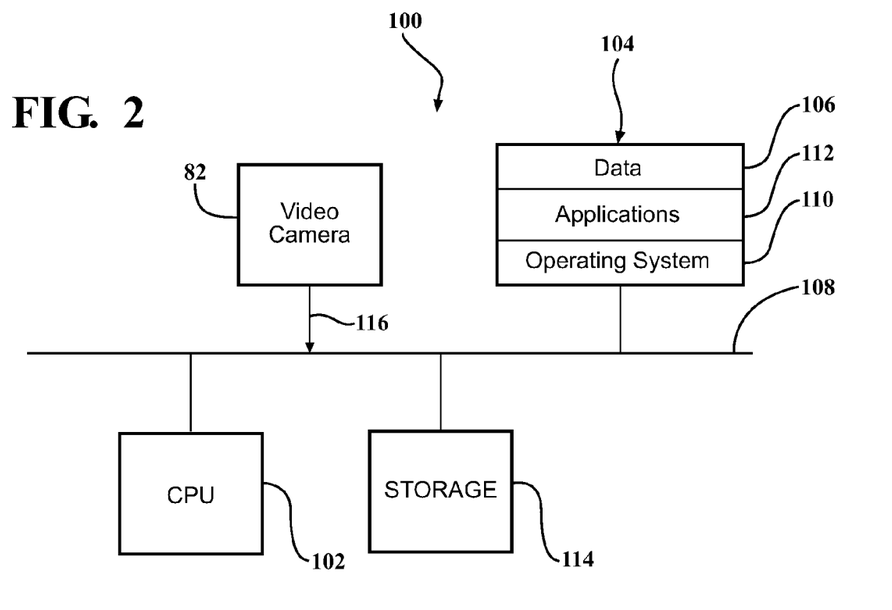
FIG. 2 is a block diagram of a computing device for implementing the disclosed method and forming part of the disclosed apparatus.
Figure 3:
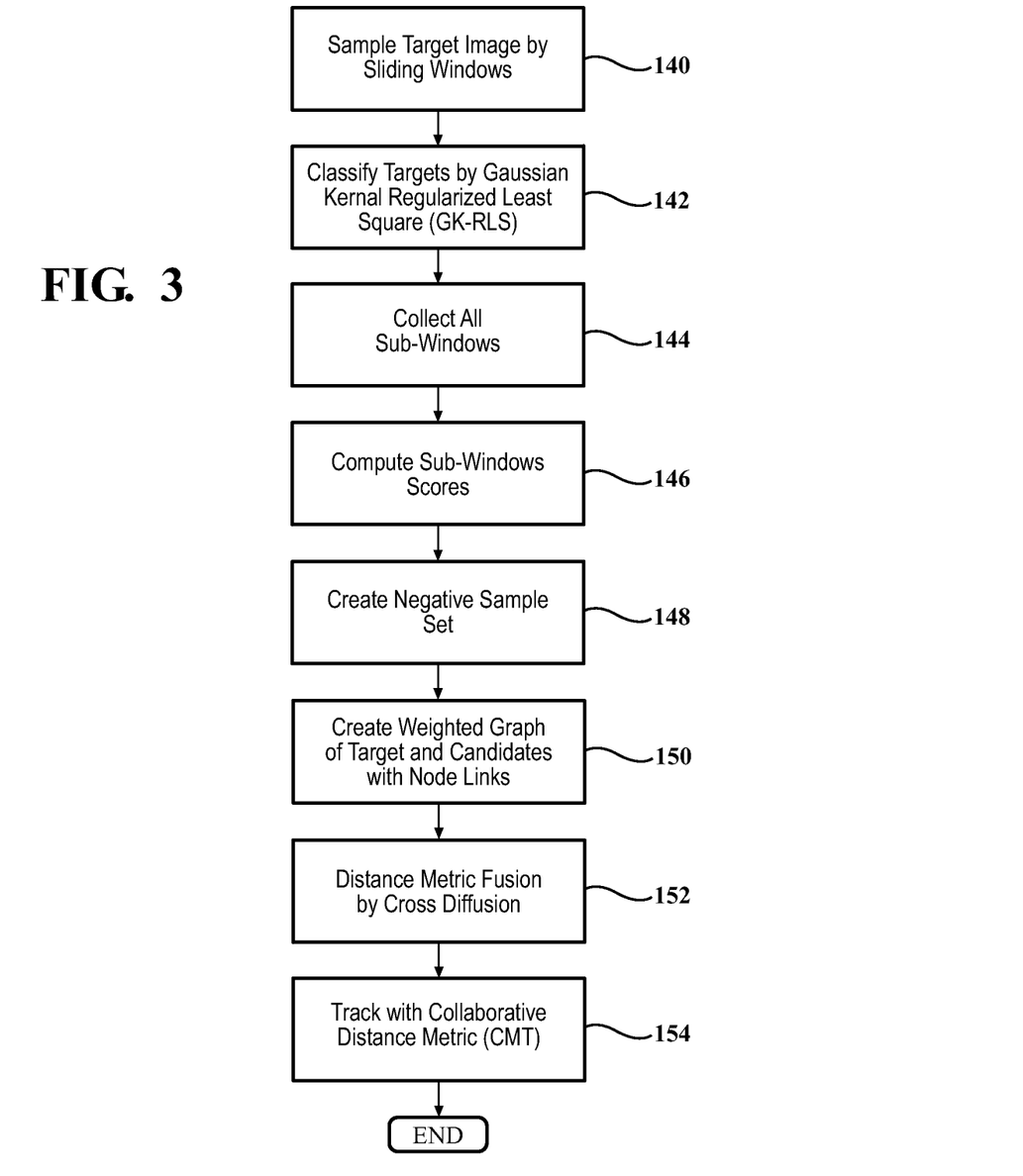
FIG. 3 is a flow chart depicting the method sequence.
Figure 4A:
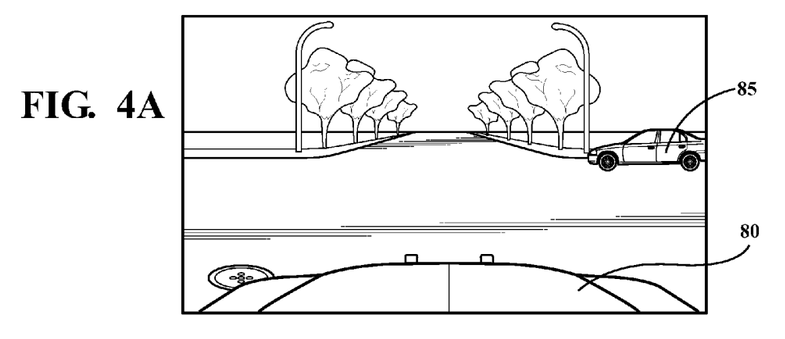
FIGS. 4A-4E are sequential image frames captioned by an image sensor.
Figure 4B:
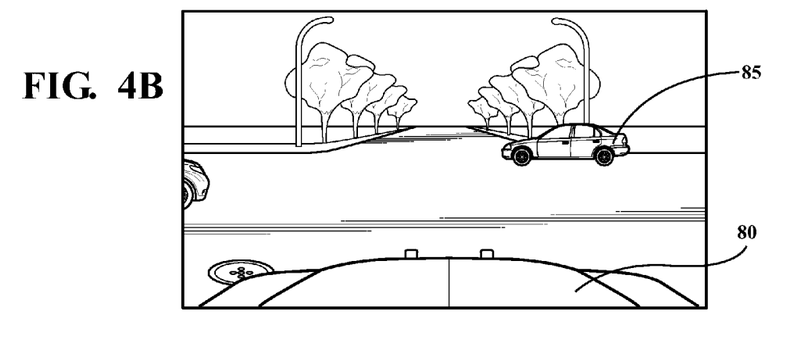
Figure 4C:
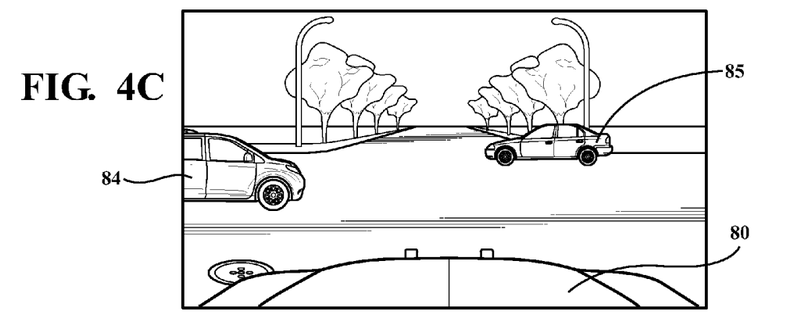
Figure 4D:
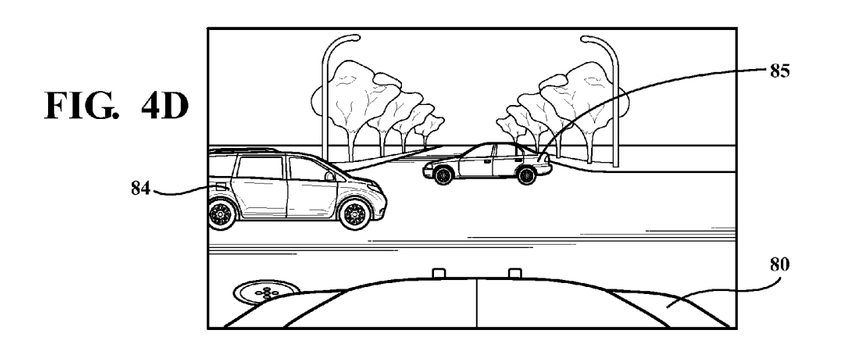
Figure 4E:
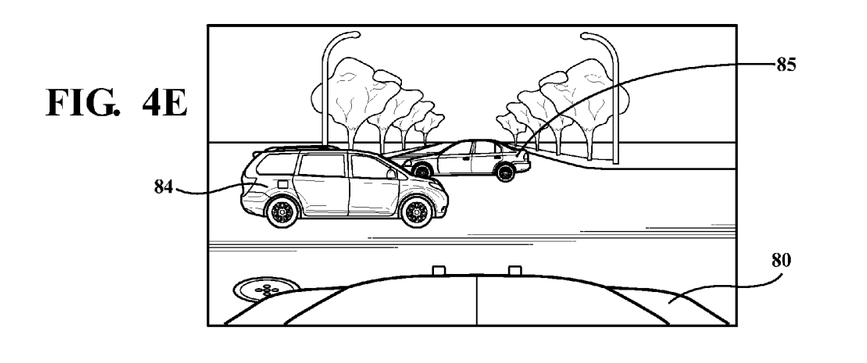

Referring now to the drawing, and to FIGS. 1-3 in particular, there is depicted an object tracking apparatus useful in implementing an object tracking method using comparative distance metric learning.

The apparatus, which can be mounted, for example, on a moving vehicle 80, includes an image sensor or camera 82. By way of example, the camera 82 may be a high definition video camera with a resolution of 1024 pixels per frame.

The camera 82, in addition to possibly being a high definition camera 82, for example, can also be a big-picture/macro-view (normal or wide angle) or a telephoto camera. Two types of cameras, one having normal video output and the other providing a big-picture/macro-view normal or wide angle or telephoto output, may be employed on the vehicle 80. This would enable one camera to produce a big-picture/macro view, while the other camera could zoom in on parts of the target.

The apparatus, using the image sensor or camera 82 and the control system described hereafter and shown in FIG. 2, detects an object, such as vehicle 84, and/or vehicle 85, described hereafter as detected objects by example, on a roadway 86 to the front, side or even, in some applications, to the rear of the vehicle 80 within the field of view 88 of the camera 82.

The method can be implemented by the apparatus which includes a computing device 100 shown in a block diagram form in FIG. 2. The computing device 100 can be any type of computing device, including a handheld, desktop, or other form of single computing device, or it can be formed of multiple computing devices. A CPU 102 in the computing device 100 can be a conventional central processing unit or any other type of device, or multiple devices, capable of manipulating or processing information. A memory 104 in the computing device 100 can be a Random Access Memory device (RAM) or any other suitable type of storage device. The memory 104 can include data 106 that is accessed by the CPU 102 using a bus 108. The memory 104 can also include an operating system 110 and installed applications 112. The installed applications 112 include programs that permit the CPU 102 to perform the object tracking method described herein.

The computing device 100 can also include secondary, additional, or external storage 114, for example, a memory card, flash drive, or other forms of computer readable medium. The installed applications 112 can be stored in whole or in part in the secondary storage 114 and loaded into the memory 104 as needed for processing.

The computing device 100 can be mounted on the vehicle 80 or situated remote from the vehicle 80. In the latter case, remote communication will be used between the camera 82 and the computing device 100.

The computing device 100 receives an input in the form of sequential video frame image data 116 from the image sensor or camera 82 mounted on the vehicle 80. The video image data 116 may be stored in the memory 104 and/or the secondary storage 114.

Using a high definition output 116 from the camera 82, the target will have a reasonable size, as shown in FIGS. 4A-4E, to enable the segmentation of meaningful parts from the vehicles 84 or 85 with a reasonable size to implement tracking.

FIGS. 4A-4E are successive image frames showing the continued movement of objects or vehicles 84 and 85 across the front of the viewing vehicle 80. For example, if a license plate is segmented as one part and tracked, the license plate can provide a unique identification of the vehicle 84 or 85 as long as it has enough resolution to be successfully tracked. As another example, many vehicles can be tracked by relying on their unique shapes or styling features, such as front grills, lights, manufacture logos, etc.

The presently disclosed object tracking method and apparatus uses an algorithm where a matching process plays a role in which the performance relies on the selected distance metric for matching one-step further. The matching process in a tracking problem is formulated as:

$$\min_i d^2(t, c_i) \tag{1}$$

where t is the target's appearance model and $c_i$ is the $i^{th}$ target candidate's appearance model in the current image frame. $d(\bullet, \bullet)$ is the distance function measured by the distance metric. Here, the form of Mahalanobis distance is used to represent the distance function as following by introducing a measure matrix M:

$$d^2(t, c_i) = \|t - c_i\|_{M \neq 0}^2 = (t - c_i)^T M (t - c_i) \tag{2}$$

Since M is symmetric and positive semi-definite, the Eq. 2 can be rewritten as:

$$d^2 = (t - c_i)^T A A^T (t - c_i) \tag{3}$$

where $M=A^TA$ represents the distance metric matrix, and $A^T$ is the projection matrix.

Supervised distance metric learning methods instead of the unsupervised ones are used because the tracker can utilize information attained from the tracking process which is more valid. During supervised distance metric learning process, sufficient samples are collected to guarantee a good result. Unfortunately, it has become a computational burden that directly conflicts with real-time requirements.

In most cases, sample-selection methods tend to conduct random sampling as a sacrifice to obtain efficiency. A fast frequency domain sample-selection method is used to supervise distance metric training process as a solution that takes all samples into computation.

The positive and negative samples x are collected with label y as +1 and −1 respectively, and used to train a ridge regression to obtain the parameter z:

$$\min_z[J(y,h_z(x))+\mu\|z\|_2^2],$$

where $J(y, h_z(x))=[y-k(z,x)]^2$ and $$k(z, x) = \exp\left(-\frac{\|z-x\|^2}{2\sigma^2}\right)$$

is a Gaussian kernel.

The parameter z, is known. The Gaussian kernel regularized least square classifies input image $x_i$ as:

$$y=k(z,x_i).$$

This is a response score for each input image; the score with large value is more likely to be the positive samples.

Figure 5A:
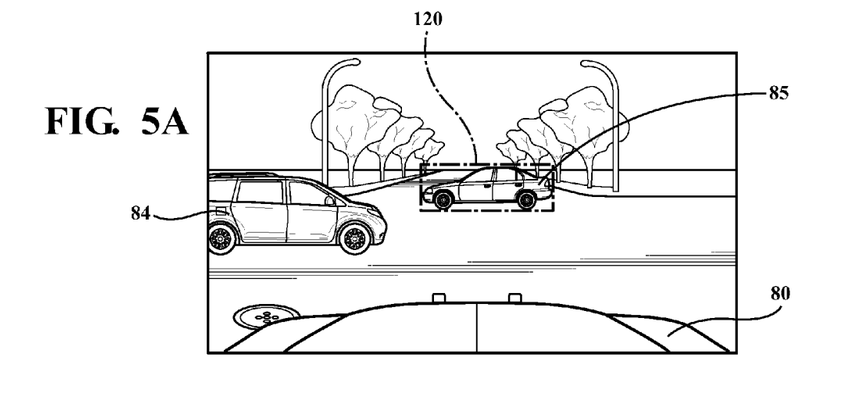
FIGS. 5A and 5B are images of sample target windows in one image frame.
Figure 5B:
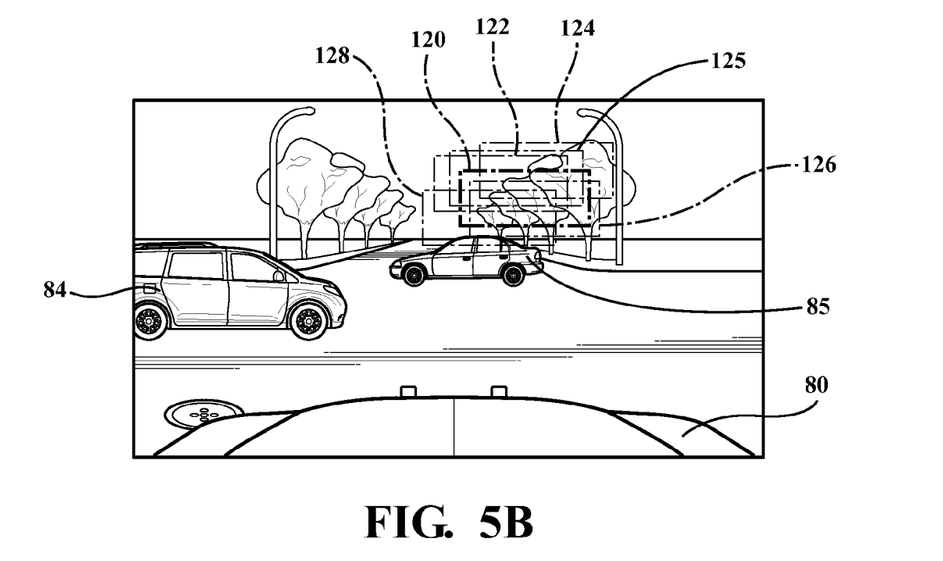
Figure 6:
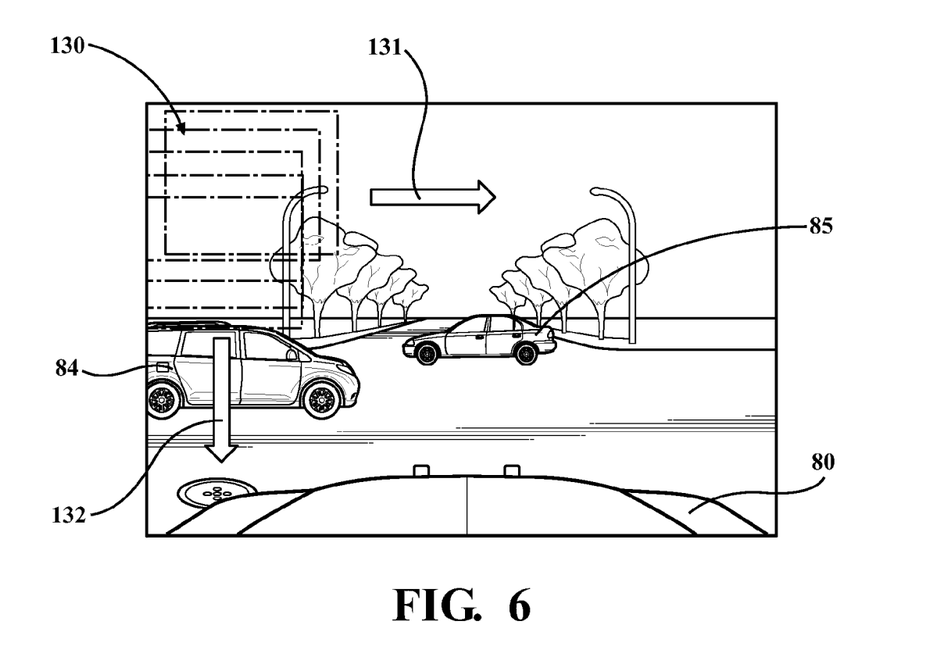
FIG. 6 is a pictorial representation of the application of sliding windows to image frames.

In FIG. 5A, a sample window 120 is generated about vehicle or object 85 in a first frame to establish a first target image of object 85 depicting a first tracking position associated with the target object 85 in one frame of the image sequence. Next, as shown in FIG. 5B, the plurality of sample windows 122, 124, 125, 126 and 128, for example are created by the processor CPU 102 about the target image 85. Next, as shown in FIG. 6, the sub-windows 130 are circulated by a sliding window approach in the direction of the arrows 131, 132 in FIG. 6 over the image frame.

A pre-process includes two steps. In step one, a simple classifier in the current frame is trained; then this classifier is used to compute classification score of all the sub-windows around target in the next step. By utilizing a circulated structure of sub-windows 130 in FIG. 6, a closed-form solution is obtained, which significantly cuts the computational complexity.

First, all sub-windows are collected by sliding window approach denoted by $W=(w_1, w_2, \ldots, w_M)$, $w_i \in \mathbb{R}^{r \times c}$ with the same size as the target in the current frame, which can be divided into positive and negative sets as $$W=(W_+,W_-) \tag{4}$$

Each sub-window in $W_+$ has a label +1, while that in $W_-$ has a label −1.

A Gaussian Kernel Regularized Least Square (GK-RLS) is chosen as the classifier, which has the form $$h_z(x)=\kappa\langle z,x\rangle \tag{5}$$

Where $\kappa\langle\cdot,\cdot\rangle$ is the Gaussian Kernel functioning on classifier parameter z and input data x.

Since there is a need to handle non-linear data, the Kernel Trick is used for this problem.

Figure 7:
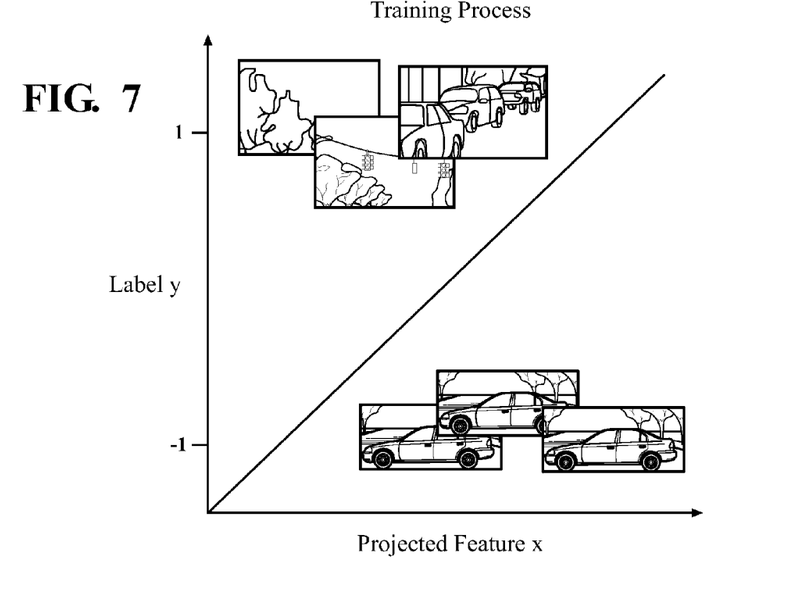
FIG. 7 is a graph depicting image classifications.

The parameter z of GK-RLS classifier can be obtained by solving the minimization problem of ridge regression:

$$\min_z[J(y,h_z(x))+\mu\|z\|_2^2] \tag{6}$$

where y is the label vector. In Eq. 6, the former term is the loss function and $\mu\|z\|_2^2$ is the regularization term with $\mu$ being the weight. This is shown graphically in FIG. 7. The simple closed form solution is obtained and transformed to frequency-domain by Fast Fourier Transform (FFT) and Inverse Fast Fourier Transform (IFFT). The solution is:

$$\mathcal{FFT}(z) = \frac{\mathcal{FFT}(y)}{\mathcal{FFT}(\kappa(x, x)) + \mu} \tag{7}$$

where FFT is Fast Fourier Transform and K(x, x) is the Gaussian Kernel. Especially for the problem, Eq. 7 is specified to $$\mathcal{FFT}(z) = \frac{\mathcal{FFT}([1, -1])}{\mathcal{FFT}(\kappa([W_+, W_-], [W_+, W_-])) + \mu} \tag{8}$$

where [1,−1] is the label vector corresponding to positive and negative set.

Figure 8:
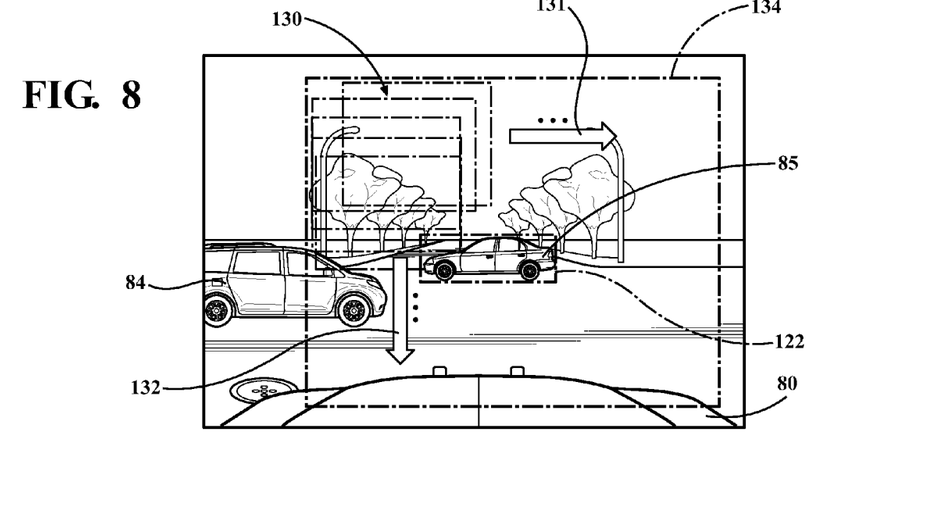
FIG. 8 is a pictorial representation of the application of sub-windows to an image frame.

The trained classifier conducts the second step. In the next image frame, the sub-windows are created by the sliding windows in the area around the target. The large target area is shown by the square 134 in FIG. 8, with the target depicted by box 122. All the sub-windows denoted as $S=(s_1, s_2, \ldots, s_M)$, $s_i \in \mathbb{R}^{r \times c}$ are collected. The score of each sub-window can be computed by:

$$\text{response}=h_z(S)=\kappa(z,S) \tag{9}$$

which can also be transformed into frequency domain to obtain an efficient solving as $$\mathcal{FFT}(\text{response})=\mathcal{FFT}(K)\odot\mathcal{FFT}(z) \tag{10}$$

where K is the vector with elements of $K(_z, S)$.

Next, the samples are selected with higher response score but not occluded with tracking result of last frame as negative samples. This is because including the occluded samples with the target will let the distance metric mistake the foreground as background.

Figure 9:
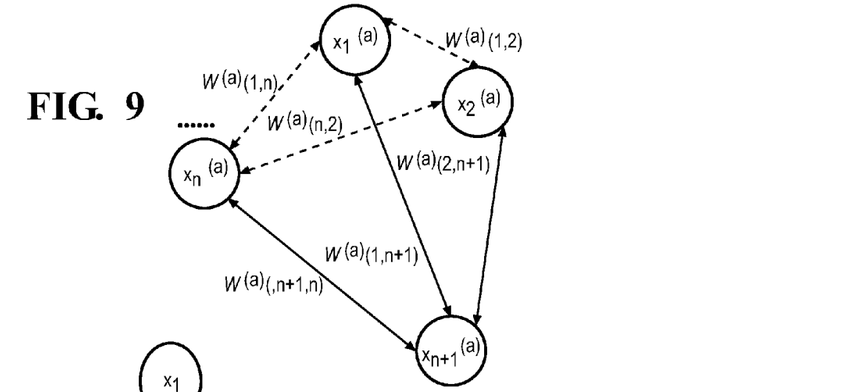
FIG. 9 is a weight graph.

A finite weighted graph G=(V,E), See FIG. 9, with target candidates as vertices V and links between pairs of nodes as edges E is constructed. The weighted graph W:

Candidate nodes in a feature: $x_1^{(a)}, \ldots, x_n^{(a)}$
Template node in a feature: $x_{n+1}^{(a)}$
Edges weight in a feature:

$$w^{(a)}(i, j) = \exp\left(-\frac{\phi(x_i^{(a)}, x_j^{(a)})}{\mu\sigma^2}\right),$$

where $i,j=1,\ldots,n+1$ and $\phi(\cdot,\cdot)$ is the distance measured by the learned metric between nodes.

Because the weights of the edges encode nodal affinity such that nodes connected by an edge with high weight are considered to be strongly connected and edges with low weights represent nearly disconnected nodes. The weight can be viewed as a similarity measure between vertices, so it is also nonnegative and symmetric. In this work, the weight of the edge $e_{ij}$ between nodes i and j is defined as $$w_{ij}=e^{-d_{ij}^2/\sigma^2} \quad (11)$$

where $d_{ij}$ represents the distance between nodes i and j and a is a constant that controls the strength of the weight. Usually features and operators are chosen as representations. The normalization of the weight matrix $P=D^{-1} \times W$ can be interpreted as a natural kernel acting on functions on V, so that the sum of each P's row is all 1, where $D=\text{diag}(\Sigma w_{ij})$, $W=[w_{ij}]$ The weighted identity matrix $$\rho I = \rho \times \begin{pmatrix} 1 & 0 & \cdots & 0 & 0 \\ 0 & 1 & 0 & 0 & 0 \\ \vdots & \vdots & \ddots & \vdots & \vdots \\ 0 & 0 & 0 & 1 & 0 \\ 0 & 0 & \cdots & 0 & 1 \end{pmatrix} = \begin{pmatrix} \rho & 0 & \cdots & 0 & 0 \\ 0 & \rho & 0 & 0 & 0 \\ \vdots & \vdots & \ddots & \vdots & \vdots \\ 0 & 0 & 0 & \rho & 0 \\ 0 & 0 & \cdots & 0 & \rho \end{pmatrix};$$

The status matrix P is the normalized weighted graph W ($W=[w_{ij}]$), i.e. $P=D^{-1}W$, where $D=\text{diag}(\Sigma_j w_{ij})$.

The final decision matrix $D_f$ is the arithmetic mean of two status matrix after it steps cross diffusion: $D_f=\frac{1}{2} \times (P_{(1)}^{it+1} + P_{(2)}^{it+1})$.

With the assumption of that local similarities with high values are more reliable than far-away ones, an affinity matrix is constructed using K nearest neighbors (KNN) method, denoted as A with elements:

$$a_{ij} = \begin{cases} w_{ij} & j \in N(i) \\ 1 & \text{if } i = j \\ 0 & \text{otherwise} \end{cases} \quad (12)$$

where N(i) represents node i's k nearest neighborhood. The corresponding natural kernel becomes:

$$Q = R^{-1} \times A \quad (13)$$

where $R=\text{diag}(\Sigma_j a_{ij})$ It is concluded that W is a fully connected graph, so that P encodes the full information about the similarity of each vertex to all the others, whereas Q only carries the similarity between adjacent nodes and becomes a sparsely connected graph.

Figure 10A:
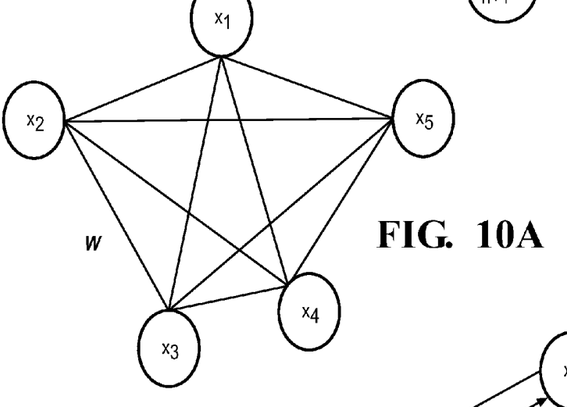
FIG. 10A is another example of a weighted identity matrix.
Figure 10B:
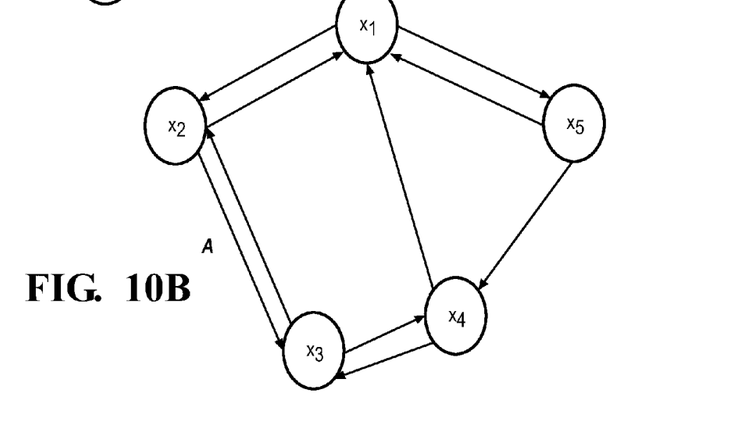
FIG. 10B is a pictorial representation of an affinity matrix based on the weighted identity matrix shown in FIG. 10A.

FIGS. 10A and 10B show a simple example to illustrate the relation between W and A.

| W | $x_1$ | $x_2$ | $x_3$ | $x_4$ | $x_5$ |
|---|---|---|---|---|---|
| $x_1$ | 1 | 0.050 | 0.067 | 0.025 | 0.060 |
| $x_2$ | 0.050 | 1 | 0.018 | 0.011 | 0.004 |
| $x_3$ | 0.067 | 0.018 | 1 | 0.223 | 0.005 |
| $x_4$ | 0.025 | 0.011 | 0.223 | 1 | 0.008 |
| $x_5$ | 0.060 | 0.004 | 0.005 | 0.008 | 1 |

| A | $x_1$ | $x_2$ | $x_3$ | $x_4$ | $x_5$ |
|---|---|---|---|---|---|
| $x_1$ | 1 | 0.050 | 0 | 0 | 0.060 |
| $x_2$ | 0.050 | 1 | 0.018 | 0 | 0 |
| $x_3$ | 0 | 0.018 | 1 | 0.223 | 0 |
| $x_4$ | 0.025 | 0 | 0.223 | 1 | 0 |
| $x_5$ | 0.060 | 0 | 0 | 0.008 | 1 |

Two graphs of different metrics are fused by cross diffusion process. Let $V_{(i)} = [V_{(i)_1}, V_{(i)_2}, V_{(i)_l}]$ be the vertices of Graph $G_{(i)}$), where. i=1,2 represents the $i^{th}$ similarity measure method between data nodes. Therefore the $W_{(i)}$ and $A_{(i)}$ matrix is obtained by using Eq. 11 and Eq. 12 respectively. Then by row normalization, $P_{(i)}$ and $Q_{(i)}$ are obtained as well. In the diffusion process, the algorithm starts from $P_{(i)}$ as initial status matrix and $Q_{(i)}$ is used as the kernel matrix.

As different perspectives of representing data have complementarity and single description cannot achieve satisfactory performance because of the loss of completeness. Intuitively, fusion of complement representations can offer better result.

In this process, just two different methods are used to measure similarity between data nodes, to different weight matrix, affinity matrix and also their corresponding normalization matrix, denoted by $W_{(1)}$ and $W_{(2)}$, also $P_{(1)}$ and $P_{(2)}$, $A_{(1)}$ and $A_{(2)}$, $Q_{(1)}$ and $Q_{(2)}$. The fusion process is defined as:

$$P_{(1)}^{it+1} = Q_{(1)} \times P_{(2)}^{it} \times P_{(1)}^T + \rho I$$

$$P_{(2)}^{it+1} = Q_{(2)} \times P_{(1)}^{it} \times Q_{(2)}^T + \rho I \quad (14)$$

where i'=0,1, ... is the iteration times, and $P_{(1)}^0=P_{(1)}$, $P_{(2)}^0=P_{(2)}$ as the initial states. $\rho I$ is a weighted identity matrix to guarantee self-similarity. This process will finally converge and the two-status matrix will become almost the same, so that the decision matrix Df is obtained by computing the arithmetic mean value of two converged status matrix:

$$D_f = \frac{1}{2} \times (P_{(1)}^{it+1} + P_{(2)}^{it+1}) \quad (15)$$

Either status matrix can be chosen as the final decision matrix as well without a large difference. Since in every iteration status matrix of one measure is modified by the kernel matrix corresponding to the other measure's KNN graph and the KNN processing can reduce noise between instances, the decision matrix has robust performance. The decision matrix is used to match target and candidate and obtain better performance than either measure method alone.

Figure 11A:
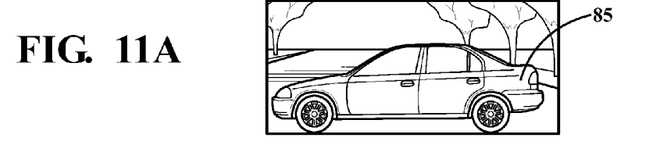
FIG. 11A is a pictorial representation of one image frame.

Two similarity measure approaches are used; each of them is a feature projecting to a distance metric space model. One is RGB-doublet-SVM, which is to project RGB histogram feature, see FIGS. 11A and 11B to doublet-SVM [16] distance metric space. The doublet-SVM metric is chosen mainly because it can achieve better performance using significant less time. This algorithm is about 2000 times faster in average than the most efficient method ITML among several state-of-the-art distance metric learning algorithms including LDML, MCML, LMNN and NCA. The other similarity measure is SC-MP, which uses sparse coding coefficient as the feature which can handle occlusion challenges, and let the max-pooling act as the distance metric. Because max-pooling process is able to select the most significant dimensions of the feature which has the same function as a distance metric.

Let $W=(W_+, W_-)=\{(w_l,y_l)|l=1, \ldots, L\}$ be the samples set obtained by samples selection mechanism introduced in proceeding parts, where $y_l$ is the label having value +1 in $W_+$ and −1 in $W_-$ and L is the number of samples. Then according to the pair constraints, doublets D are constructed for doublet-SVM distance metric learning by extracting any two samples from W $$D=\{(w_m, w_n, z_l)|m,n=1,\ldots,L, m \neq n\} \quad (16)$$

where $z_l=+1$ when $y_m=y_n$ and $z_l=-1$ when $y_m \neq y_n$. By defining a kernel of doublet $D_i=(w_{i1}, w_{i2}, z_i)$ and $D_j=(w_{j1}, w_{j2}, z_j)$ as $$\kappa_d(D_i,D_j)=tr[(w_{i1}-w_{i2})(w_{i1}-w_{i2})^T(w_{j1}-w_{j2})(w_{j1}-w_{j2})^T] \quad (17)$$

A kernel SVM is learned that classifies the training samples best. The doublet-SVM is defined as:

$$\min_{M,c,\xi} h\sum_l \xi_l + \frac{1}{2}\|M_1\|_F^2$$

$$z_l[(w_{l1}-w_{l2})^T M_1(w_{l1}-w_{l2})+c] \geq 1-\xi_l \quad (18)$$

Where $\|\cdot\|_F$ denotes the Frobenius norm, c is the bias, h is the weight of hinge loss penalty and $\xi_l$ is a slack variable. In Eq. 18, $M_1$ represents the doublet-SVM distance metric to be learnt and according to the Mahalanobis metric definition, $$M_1 = \Sigma_i \lambda_i z_i (w_{i2}-w_{i2})(w_{i1}-w_{i2})^T \quad (19)$$

with $\lambda_i$ being the weight. Then the first constraint condition in Eq. 18 becomes $$z_l[(w_{l1}-w_{l2})^T M_1(w_{l1}-w_{l2})+c] \geq 1-\xi_l \Longrightarrow \Sigma_i \lambda_i z_i z_l \kappa d(D_l, D_i)+z_l c \geq 1-\xi_l \quad (20)$$

which is the common kernel SVM form. In addition, many existing SVM solvers such as LibSVM [20] can easily solve the Lagrange dual form of Eq. 18.

Figure 11B:
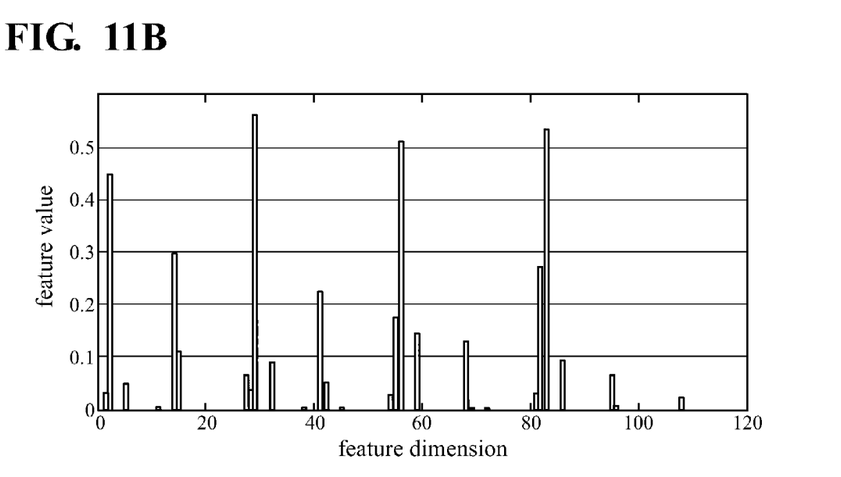
FIG. 11B is an RGB Histogram of the image shown in FIG. 11A.
Figure 11C:
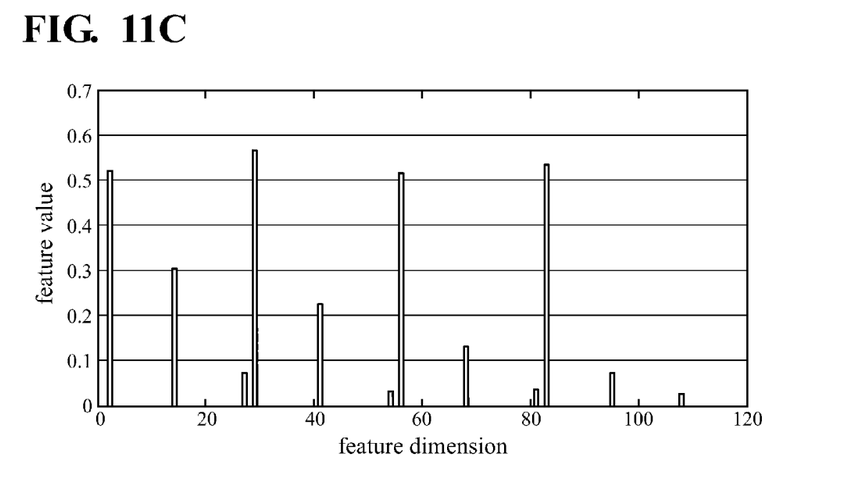
FIG. 11C is a graph depicting a max-pooling metric using the RGB histogram of FIG. 11B.

Let $C=[c1, c2, \ldots, cl]$ be representation of the candidates set in the current frame generated by particle filter, where l is the number of particles and $ci \in R^{M*N}$. T represents the target in the last frame; T is also an M×N matrix. Then the vertices for graph construction is to concatenate the templates and candidates, which is $V=[T,C]=[T, c1, c2, \ldots, cl]$. To compute the similarity between nodes, we first extract two kinds of features from the vertices:

$$F_1 = RGB(V) \quad (21)$$

$$F_2 = SC(V) \quad (21)$$

where RGB is RGB histogram approach and SC is to extract sparse coding coefficient from each node as a feature. Then two corresponding distance metrics doublet-SVM and Max-Pooling, see FIGS. 11B and 11C, are trained by samples selected using method described above they are denoted by M1 and M2. So far, it is possible to obtain the similarity between the template and target candidates as the form of Mahalanobis distance:

$$D_s(i,j) = [F_s(i)-F_s(j)] M_s [F_s(i)-F_s(j)]^T \quad (22)$$

where s=1,2 correspond to the two features and distance metrics. By utilizing fusion process described above the decision matrix $D_f$ is obtained. Then the target candidate corresponding to the largest value in the first row of Df is chosen as the final tracking result of the current frame, because the first row denotes the similarities between the target and target candidates.

Accordingly, the apparatus and method perform the following sequence of steps including sampling a target image containing a plurality of sample windows by a sliding window approach in step 140 in FIG. 3. Next, the targets in the sliding windows are classified by Gaussian Kernel Regularized Least Square process in step 142.

Next, in step 144, the processor collects all sub-windows and, in step 146, computes scores for all of the sub-windows.

The processor creates a negative sample set in step 148 and then computes two weighted graphs of the template and target candidates with node lengths in step 150. The processor chooses two graphs by a distance metric fusion using cross diffusion in step 152 to track a target object across a sequence of an image frame using a collaborative distance metric in step 154.

What is claimed is:

1. A method for tracking a target object in sequential frames of images containing the target object, the method comprising:
    determining a target image depicting a first tracking position associated with a target object in one frame of an image sequence;
    generating, by a processor, a plurality of sample windows about the first tracking position of the target object by using sliding windows;
    classifying, by the processor, image targets in sliding windows by Gaussian Kernel Regularized least Square;
    collecting all sub-windows;
    computing sub-window scores;
    creating, by the processor, a negative sample set;
    creating two weight graphs of a template and target candidates with node links;
    calculating, by the processor, a distance metric fusion by cross diffusion; and
    tracking an object to the sequential frames of images using a collaborative distance metric.

2. The method of claim 1 wherein the step of collecting the sub-windows comprises:
    collecting all sub-windows by a sliding window process.

3. The method of claim 1 wherein the step of computing sub-windows scores comprises:
    selecting samples with a higher response score.

4. The method of claim 1 wherein the step of generating a distance metric fusion by cross diffusion comprises:
    generating, by the processor, two finite weighted graphs with the template and target candidate as vertices and links between pairs of nodes as edges; and
    fusing the two finite weighted graphs by cross diffusion.

5. The method of claim 4 further comprising:
    constructing an affinity matrix using a K nearest neighbors method, where K is a constant.

6. The method of claim 5 further comprising:
    constructing, by the processor, a weighted identity matrix, a plurality of status matrices; and
    choosing an arithmetic average of two status matrices generated in a last iteration as a final decision matrix.

7. The method of claim 1 wherein the step of tracking with a collaborative distance metric comprises:
    using a RGB-doublet-SVM to project a RGB histogram to a doublet-SVM distance metric state.

8. The method of claim 7 further comprising:
    training a doublet-SVM distance metric and a max-pooling distance metric by positive and negative samples.

9. The method of claim 8 further comprising:
    selecting a candidate in a decision matrix having the largest value as a final tracking result of the target object in a current image frame.

10. An apparatus for tracking an object over a plurality of sequential image frames, the apparatus comprising:
    an image sensor generating a plurality of sequential image frames of a target object in a field of view of the image sensor and outputting the sequential image frames;
    a processor receiving, the sequential image frames from the image sensor;
    the processor executing program instructions to:
        determining a target image depicting a first tracking position associated with a target object in one frame of an image sequence;
        generating, by a processor, a plurality of sample windows about the first tracking position of the target object by using sliding windows;

classifying, by the processor, image targets in sliding windows by Gaussian Kernel Regularized Least Square;
collecting all sub-windows;
computing sub-window scores;
creating, by the processor, a negative sample set;
creating two weight graphs of a template and target candidates with node links;
calculating, by the processor, a district metric fusion by cross diffusion; and
tracking an object to the sequential image frames using a collaborating distance metric.

11. The apparatus of claim 10 wherein:
the processor collects all sub-windows by a sliding window process.

12. The apparatus of claim 10 wherein:
the processor selects samples with a higher response score.

13. The apparatus of claim 10 wherein:
the processor generates a distance metric fusion by crossed diffusion by generating two finite weighted graphs with the template and target candidates as vertices and links between pairs of nodes as edges; and
fusing the two finite weighted graphs by crossed diffusion.

14. The apparatus of claim 13 wherein:
the processor constructs an affinity matrix using a K nearest neighbors method, where K is a constant.

15. The apparatus of claim 14 wherein:
the processor constructs a weighted identity matrix and a plurality of status matrices; and
the processor chooses an arithmetic average of two status matrices generated in a last iteration as a final decision matrix.

16. The apparatus of claim 10 wherein:
the processor tracks with a collaborative distance metric using a RGB-doublet-SVM to project a RGB histogram to a doublet-SVM distance metric state.

17. The apparatus of claim 16 wherein:
the processor trains a doublet-SVM distance metric and a max-pooling distance metric by positive and negative samples.

18. The apparatus of claim 17 wherein:
the processor selects a candidate in a decision matrix having the largest value as a final tracking result of a target object in a current image frame.

* * * * *